US012686055B2

(12) United States Patent
Perigo et al.

(10) Patent No.: US 12,686,055 B2
(45) Date of Patent: Jul. 21, 2026

(54) METHOD AND SYSTEM FOR ADDITIVE MANUFACTURING OF ELECTRICAL DEVICES

(71) Applicant: Hitachi Energy Ltd, Zürich (CH)

(72) Inventors: Elio Perigo, Wendell, NC (US); Jonah Kadoko, Mint Hill, NC (US); Daniel Pierce Armstrong, Apex, NC (US); Matthew Hetrich, Raleigh, NC (US); Cherif Ghoul, Raleigh, NC (US); Krzysztof Kasza, Cracow (PL); Lukasz Matysiak, Cracow (PL)

(73) Assignee: Hitachi Energy Ltd, Zürich (CH)

( * ) Notice: Subject to any disclaimer, the term of this patent is extended or adjusted under 35 U.S.C. 154(b) by 877 days.

(21) Appl. No.: 17/640,401

(22) PCT Filed: Apr. 30, 2020

(86) PCT No.: PCT/US2020/030750
§ 371 (c)(1),
(2) Date: Mar. 4, 2022

(87) PCT Pub. No.: WO2021/221663
PCT Pub. Date: Nov. 4, 2021

(65) Prior Publication Data
US 2022/0324025 A1     Oct. 13, 2022

(51) Int. Cl.
*B22F 10/28*          (2021.01)
*B29C 64/153*        (2017.01)
(Continued)

(52) U.S. Cl.
CPC ............ *B22F 10/28* (2021.01); *B29C 64/153* (2017.08); *B33Y 10/00* (2014.12); *B33Y 80/00* (2014.12);
(Continued)

(58) Field of Classification Search
CPC .. B22F 10/28; B22F 2998/10; B22F 2999/00; B22F 7/06; B22F 10/10; B22F 10/18;
(Continued)

(56) References Cited

U.S. PATENT DOCUMENTS

| | | | |
|---|---|---|---|
| 7,231,275 B2 | 6/2007 | Silverbrook | |
| 11,045,998 B2 * | 6/2021 | Martini | ................. B29C 64/106 |

(Continued)

FOREIGN PATENT DOCUMENTS

| | | |
|---|---|---|
| CN | 202352521 U | 7/2012 |
| CN | 103730202 A | 4/2014 |

(Continued)

OTHER PUBLICATIONS

Extended European Search Report for EP Patent Application No. 20933184.2, mailed Jan. 5, 2024, 8 pages.
(Continued)

*Primary Examiner* — John A Hevey
(74) *Attorney, Agent, or Firm* — Sage Patent Group

(57) ABSTRACT

A system and method for forming electrical devices via additive manufacturing processes that utilize starting materials that are in a solid state at least prior to, as well as after, the formation of the electrical device. A first solid starting material can be configured to form one or more insulator layers of the electrical device, while another solid starting material can be applied to form one or more electrically conductive layers. The starting materials can be applied layer-by-layer during formation of the electrical device such that the electrically conductive layers can become automatically embedded within the insulating layers, and vice versa. The additive manufacturing process(es) utilized to form the electrically conductive layers from solid starting materials can be different than the additive manufacturing process(es) utilized to form the insulator layers.

17 Claims, 11 Drawing Sheets

(51) Int. Cl.

| | |
|---|---|
| *B29L 31/34* | (2006.01) |
| *B33Y 10/00* | (2015.01) |
| *B33Y 80/00* | (2015.01) |
| *H01B 17/28* | (2006.01) |
| *H01B 19/00* | (2006.01) |

(52) U.S. Cl.

CPC ...... *H01B 19/00* (2013.01); *B29K 2995/0005* (2013.01); *B29K 2995/0007* (2013.01); *B29L 2031/3406* (2013.01); *H01B 17/28* (2013.01)

(58) Field of Classification Search

CPC ..... B22F 10/20; B29C 64/153; B29C 64/147; B29C 64/118; B33Y 10/00; B33Y 80/00; B33Y 30/00; B33Y 70/10; H01B 19/00; H01B 17/28; B29K 2995/0005; B29K 2995/0007; B29L 2031/3406; H01G 4/30; H01G 4/32; H01G 4/306

See application file for complete search history.

(56) References Cited

U.S. PATENT DOCUMENTS

| | | | |
|---|---|---|---|
| 2002/0015654 A1 | 2/2002 | Das et al. | |
| 2010/0221909 A1* | 9/2010 | Verilhac | H05K 3/0017 |
| | | | 427/535 |
| 2012/0234577 A1 | 9/2012 | Kim et al. | |

| | | | |
|---|---|---|---|
| 2015/0034604 A1 | 2/2015 | Subramanian et al. | |
| 2017/0182561 A1* | 6/2017 | Scancarello | B22F 10/28 |
| 2017/0184108 A1 | 6/2017 | Scancarello et al. | |
| 2019/0059155 A1* | 2/2019 | Harple | H05K 1/0393 |
| 2019/0389126 A1* | 12/2019 | Martini | B29C 64/118 |
| 2020/0235410 A1* | 7/2020 | Hall | F28D 9/0062 |

FOREIGN PATENT DOCUMENTS

| | | | | |
|---|---|---|---|---|
| CN | 104704931 A | 6/2015 | | |
| CN | 108788145 A | 11/2018 | | |
| EP | 2180485 A1 * | 4/2010 | | H01B 17/28 |
| EP | 2693612 A1 | 2/2014 | | |
| EP | 3361481 A1 | 8/2018 | | |
| WO | 20140200595 A2 | 12/2014 | | |
| WO | WO-2018146057 A1 * | 8/2018 | | B29C 64/10 |
| WO | 20190180238 A1 | 9/2019 | | |

OTHER PUBLICATIONS

International Search Report and Written Opinion of the International Searching Authority, PCT/US2020/030750, mailed Aug. 3, 2020, 10 pages.

Wikipedia, "Fused filament fabrication," retrieved from the Internet on Jul. 9, 2020 at: https://en.wikipedia.org/wiki/Fused_filament_fabrication, 14 pages.

First Office Action for Chinese Patent Application No. 2020800726106, mailed Mar. 15, 2023, 15 pages.

\* cited by examiner

METHOD AND SYSTEM FOR ADDITIVE MANUFACTURING OF ELECTRICAL DEVICES

CROSS-REFERENCE TO RELATED APPLICATIONS

This application is a 35 U.S.C. § 371 national stage application of PCT International Application No. PCT/US2020/030750 filed on Apr. 30, 2020, the disclosure and content of which is incorporated by reference herein in its entirety.

FIELD

The present disclosure relates to forming articles using additive manufacturing, and more particularly, forming electrical devices containing conductive and insulating features via additive manufacturing processes that utilize solid starting materials.

BACKGROUND

The manufacturing of electrical devices, such as, for example, capacitive devices, that include electrical conductors and insulating features remain an area of interest. Some existing systems have various shortcomings, drawbacks and disadvantages relative to certain applications, including, for example, with respect to limitations on design freedom, material selection, scrap rates, and production lead times. Accordingly, there remains a need for further contributions in this area of technology.

BRIEF SUMMARY

An aspect of an embodiment of the present application is a method for forming an electrical device that can include depositing, on at least a portion of a central core, one or more layers of a first solid starting material to form a first insulator layer. Additionally, one or more layers of a second solid starting material can be deposited on at least a portion of the first insulator layer to form a first conductor layer, the second solid starting material comprising an electrically conductive material. Further, one or more layers of the first solid starting material can be deposited on the first conductor layer to form a second insulator layer. Additionally, the first conductor layer is electrically insulated by the second insulating layer and by at least a part of the first insulating layer.

Another aspect of the present application is a method for forming an electrical device that can include applying, by a first system head, one or more layers of a first solid starting material, at least one layer of the one or more layers of the first solid starting material being applied onto a central core of the electrical device. Additionally, the applied one or more layers of the first solid starting material can be fused to form an insulator layer. A second system head can apply one or more layers of a second solid starting material onto at least a portion of the insulator layer, and the applied one or more layers of the second solid starting material can be fused to form an electrical conductor layer. The method can also include repeating the steps to form a plurality of insulator layers and a plurality of electrical conductor layers. Further, the first system head can apply one or more layers of the first solid starting material to form an outer insulator layer about an outermost layer of the plurality of electrical conductor layers.

These and other aspects of the present disclosure will be better understood in view of the drawings and following detailed description.

BRIEF DESCRIPTION OF THE DRAWINGS

The description herein makes reference to the accompanying figures wherein like reference numerals refer to like parts throughout the several views.

Figure 1:
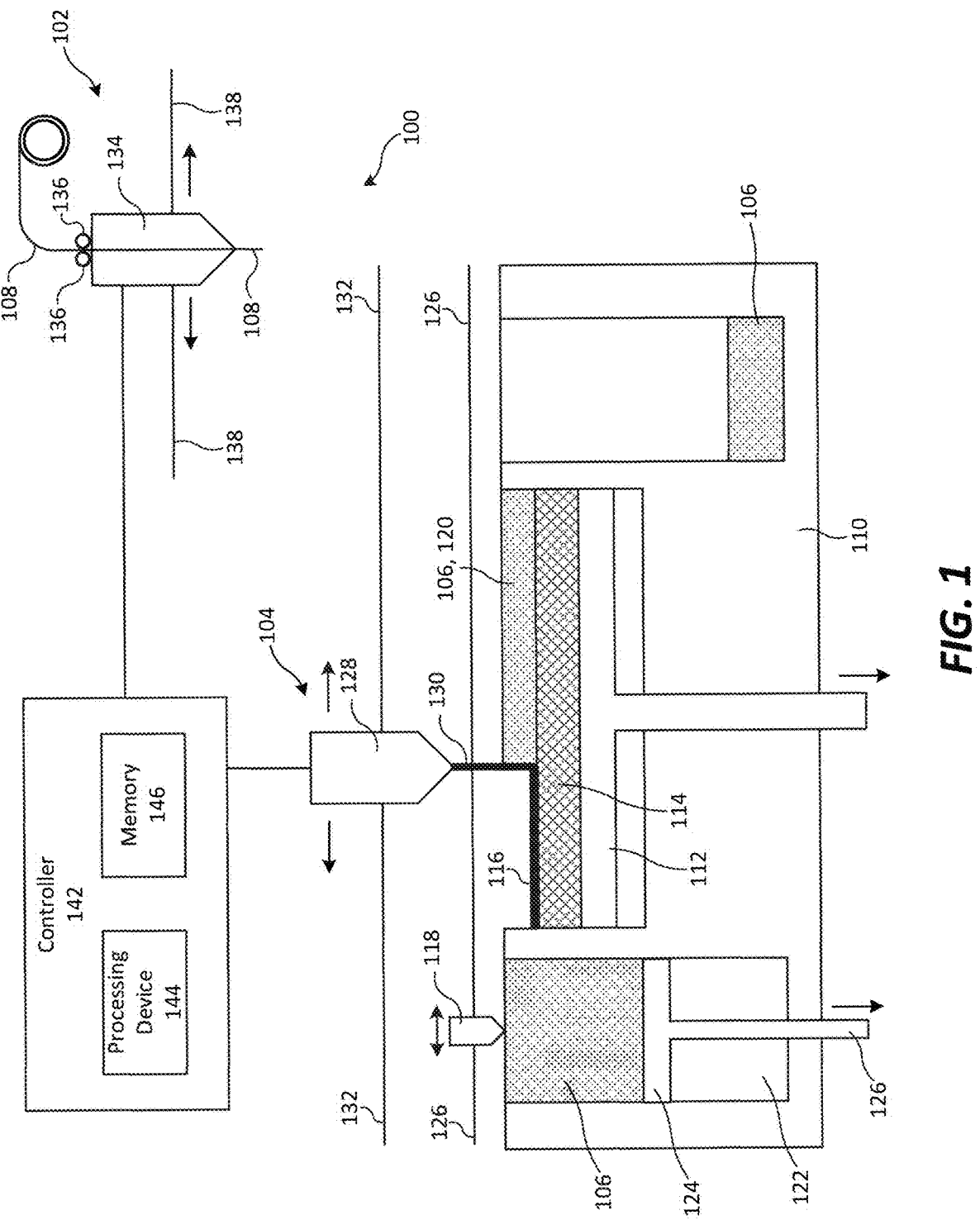
FIG. 1 illustrates a representation of an exemplary additive manufacturing system according to an embodiment of the subject application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a representation of an exemplary manufacturing system 100 according to an embodiment of the subject application. As shown, the manufacturing system 100 can comprise a first system 102 and a second system 104, the first and second systems 102, 104 each being additive manufacturing systems that utilize different solid starting materials in the formation of an electrical device. The system 100 can be used to automatically construct a variety of different, and customizable, electrical devices having varying degrees of geometric configurations and complexities, including, for example, capacitive devices, such as, but not limited to, condenser bushings and multiconductor bus bars, among other electrical devices. Moreover, according to certain embodiments of the subject application, the starting materials used to form the different components of the electrical device(s) by the additive manufacturing processes can be in a solid state at least prior to, as well as after, the manufacturing processes that are employed by the system 100. Such automated processes performed by the system 100 can, according to certain embodiments, provide for automated manufacturing of a customizable electrical device without the use of molds or tool designs, as well as be configured to accommodate the formation of more than one electrical device during a single manufacturing cycle.

According to certain embodiments, the first and second systems 102, 104 are used to build an electrical device, such as, for example, a condenser bushing, about at least a portion of a substrate, such as, for example, a central core of the condenser bushing. Each of the first and second systems 102, 104 can deposit or distribute starting materials layer-by-layer, such that, for example, features formed via use of the first system 102 can generally automatically be embedded in one or more layers of features that are formed by the second system 104, and vice versa. Further, while the below examples discuss the first and second systems 102, 104 as utilizing different types of additive manufacturing processes, according to other embodiments, the first and second systems 102, 104 can utilize the same type of additive manufacturing process. The selection of the particular type of additive manufacturing process(es) for use with embodiments of the subject application can be based on a variety of considerations, including, for example, the accuracy or resolution that can be obtained by the selected additive manufacturing process(es).

According to the illustrated embodiment, the first system 102 can be utilized in the fabrication of one or more insulating layers of the electrical device, including, but not limited to, one or more insulating layers about a central core 114 for the electrical device. The central core 113 may, or may not, be electrically conductive, and can have a variety of shapes, sizes, and configurations, including, for example, having a tube or rod shaped configuration Moreover, the first system 102 can be an additive manufacturing process that utilizes, as a first starting material 108, a polymer, ceramic, glass, and/or a sheet material, including, for example, a hybrid material that includes a ceramic and a composite material, among other materials. Further, the solid first starting material 108 used by the first system 102 can be in the form of a filament, powder, or sheet material, among other forms of solid staring materials that can be selectively applied or deposited, layer-by-layer, to the substrate and/or portion of the electrical device, such as, for example, via a deposition nozzle, print head, powder bed, or vat, among other manners of depositing the solid first starting material 108. According to certain embodiments, the first starting material 108 can be a polymer or polyester that is a thermoplastic, including, for example, acrylonitrile butadiene styrene (ABS), polyetherimide (PEI), polypropylene (PP), polyethylene (PE), polyethylene terephthalate (PET), and polybutylene, among others. Additionally, the polymer can be loaded with particles, such as, for example, a poly(lactic) acid thermoplastic that is loaded with graphene, among other additives, that is/are intended to allow the insulating layer formed with the polymer to have certain electrical and/or mechanical properties and/or benefits.

Additionally, a variety of types of additive manufacturing processes can be used by the first system 102 in connection with forming the insulating portions of the electrical device, including, for example, material extrusion, material jetting, powder bed fusion, binder jetting, material jetting, vat photopolymerization, and sheet lamination, among other processes. The type of process selected for the first system 102, as well as the form of the associated solid first starting material 108, can determine the manner in which the solid first starting material 108 is fused to other portions of the electrical device, including to other insulating layers. For example, according to certain embodiments, the first system 102 can utilize thermal or chemical reaction bonding, solid state fusion, and/or solid and melted state fusion when fusing or bonding the first starting material 108 to the electrical device.

According to the illustrated embodiment, the second system 104 can be utilized in the fabrication of at least a portion the electrical device that can provide the electrical device with one or more electrical conductors, among other metallic features and components. Thus, for example, the second system 104 can be an additive manufacturing process that utilizes a second starting material 106 that includes an electrically conductive metallic or non-metallic material, including, but not limited to, copper, copper alloys, aluminum, aluminum alloys, graphene, carbon black, carbon nanotubes, carbon nanofibers, and/or polythiophene, among other solid electrically conductive starting materials. Further, the solid second starting material 106 used by the second system 104 can be in the form of a filament, wire, powder, or sheet material, among other forms of solid staring materials, which can be selectively deposited, stacked, and/or fused, layer-by-layer, on the insulating layer(s) formed by the first system 102, and/or at least another portion of the electrical device, such as, for example, via a deposition nozzle, powder bed, and/or stacking, among other manners of depositing or distributing the solid starting material. Additionally, a variety of types of additive manufacturing processes can be used by the second system 104 in connection with forming the conductive portions of the electrical device, including, for example, direct energy deposition, powder bed fusion, sheet lamination, and/or binder jetting, among other processes. The type of process selected for the second system 104, as well as the form of the associated solid second starting material 106, can determine the manner in which the solid second starting material 106 is fused to other portions of the electrical device, including to other electrically conductive layers and/or insulating layers of the electrical device. For example, according to certain embodiments, the second system 104 can utilize an electron beam or a laser beam 130 to at least partially melt the applied second starting material 106, or, alternatively, use ultrasound when fusing the second starting material 106 to the electrical device.

For example, according to the illustrated embodiment, the first system 102 utilizes fused deposition modeling (FDM) as the additive manufacturing process, while the second system 104 utilizes selective laser melting (SLM) as the additive manufacturing process. According to such an embodiment, the system 100 can include one or more housings or fixtures 110 that can include a displaceable platform 112 that can support the electrical device and/or a central core 114 on which the electrical device is at least initially being formed. As shown in FIG. 1, according to the illustrated embodiment, the platform 112 can at least be linearly displaceable in a downward direction, including, for example, in response to an increasing thickness of the electrical device that is being formed on the central core 114 as one or more layers of insulating layers and/or one or more conductive layers 116 are deposited onto the electrical device and/or the associated central core 114. Additionally, the platform 112 can be configured to move in a variety of other directions as the electrical device is being formed such that the features of the electrical device that are being formed using the solid first starting material 108 and the second starting material 106 can be positioned at a variety of different locations along the electrical device.

The first system 102 can utilize a first system head 134 to deposit the first solid staring material 108. As the first system 102 can be configured to deposit a variety of different types of first solid starting materials 108, and/or deposit such first solid starting materials 108 in a variety of different manners for different processes, the first system head 134 can take a variety of different forms, including, for example, being an extrusion, deposition, or printing head. Moreover, the first system head 134 can have a configuration suited for the type of additive manufacturing process and/or the type of solid first starting material 108. According to certain embodiments, the first starting material 108 can be a filament, powder, or sheet, of a polymer, ceramic, and/or hybrid material, including, for example, a hybrid material that includes two or more of a polymer, ceramic, and metallic material.

According to the illustrated embodiment, the first system 102 can utilize fused deposition modeling (FDM) as the additive manufacturing process. According to such an embodiment, the first system 102 can be configured to deposit and/or fuse a solid first starting material 108 that can be used to form an insulating layer for the electrical device. Moreover, according to such an embodiment, the first system head 134 can be an extrusion head that is configured to provide local heat to extrude a solid first starting material 108 from the first system head 134. Alternatively, according to other embodiments, the first system head 134 can be configured to print the first starting material 108, fuse a powder material, or laminate a stack of sheets of the first starting material 108. Further, according to the illustrated embodiment, the first system head 134 can be fed the solid first starting material 108 by a feeder system that can include one or more feeder rollers 136.

At least a linear position of the first system head 134 can be adjustable relative to at least the platform 112, the pre-build central core 114, and/or the electrical device such that the first starting material 108 can be progressively applied by the first system head 134 to, and bond with, at least an adjacent portion of the electrical device that is be being formed, the associated platform 112, and/or a central core 114. Thus, for example, the first system head 134 can, according to certain embodiments, be at least linearly displaced, such as, for example, at least in the vertical or horizontal directions, and combinations thereof, among other directions, along a first system track, guide, or rail 138.

According to such an embodiment in which the second system 104 utilizes SLM as the additive manufacturing process, the second system 104 can include an applicator 118 that can deposit a layer or bed 120 of a solid second starting material 106 in the form of a powder material on top of the platform 112, the central core 114, and/or a conductive layer or insulating layer of the electrical device. According to the certain embodiments, the solid second starting material 106 can be a powder material, such as, for example, a fine powder comprising particles that are about 15 micrometers to about 200 micrometers in size, and/or nanoparticles having sizes that can generally be as low as around 0.5 micrometers, and more specifically, from about 5 nanometers (nm) to about 500 nanometers (nm), Further, according to certain embodiments, such a powder material can comprise electrically conductive metallic materials traditionally used for electrical conductors, including, for example, copper, copper alloy, aluminum, and/or aluminum alloy, among other electrically conductive metals. Alternatively, or optionally, according to other embodiments, the powder material can contain electrically conductive non-metallic materials, including, for example, graphene, carbon black, carbon nanotubes, carbon nanofibers, and/or polythiophene, among other non-metallic and electrically conductive species and/or composites. Further, according to certain embodiments, the non-metallic electrically conductive material can be a filler material within the powder material. Further, according to the illustrated embodiment, the housing 110 can include one or more material reservoirs 122 that can include a supply of the second starting material 106 for depositing or distribution by the applicator 118 such as, for example, in connection with forming the solid powder layer or bed 120. As shown, according to certain embodiments, the first material reservoir 122 can include a base 124 that can at least be linearly upwardly displaceable by an actuated lift 126 in the direction of the applicator 118. According certain embodiments, the applicator 118 is linearly displaceable across at least a portion of the housing 110 via track 126 or other device such that the applicator 118 can deposit or otherwise distribute the second starting material 106 at the desired location.

The second system 104 can also include a second system head 128 that can apply energy to fuse or bond the second starting material 106. The type or configuration of the second system head 128 can be based on the type of additive manufacturing process being utilized by the second system 104 and/or the associated solid second starting material 106. For example, according to the illustrated embodiment in which the second system 104 utilizes SLM, the second system head 128 can be a laser head that is configured to output an electron beam or a laser beam 130 that can melt the deposited second starting material 106 so as to form an electrically conductive layer 116 for the electrical device. Alternatively, according to other embodiments in which the second system 104 utilizes a different additive manufacturing technology, the second system head 128 can, for example, be configured to output an ultrasound signal(s) that can fuse together sheets of solid second starting material 106. Further, a liner position of the second system head 128 can be adjustable relative to at least the platform 112 and/or the pre-build central core 114 or electrical device such that the energy source outputted from the second system head 128, such as, for example, the electron beam or the laser beam 130, can be progressively applied to the solid powder layer or bed 120 of the solid second starting material 106 such that the solid metallic particles of the solid powder layer or bed 120 can be fused or bonded together and/or to adjacent conductor or insulating layers of the electrical device. Thus, for example, the second system head 128 can, according to certain embodiments, be at least linearly displaced, such as, for example, at least in a vertical or horizontal direction, and combinations thereof, among other directions, along a second system track, guide, or rail 132.

Figure 2:
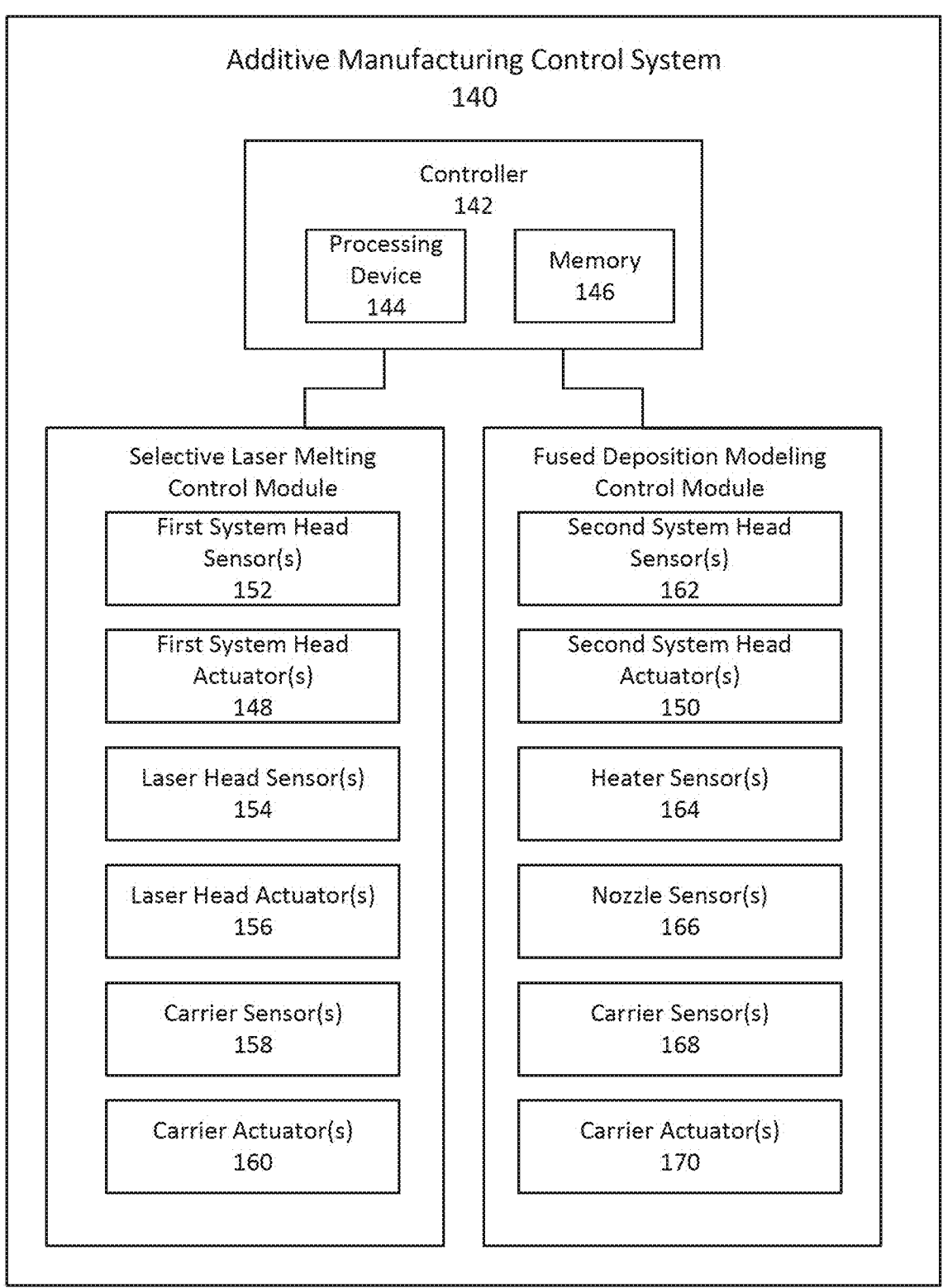
FIG. 2 illustrates an exemplary controller for an additive manufacturing system according to an embodiment of the subject application.

As shown in FIGS. 1 and 2, a control system 140 having a controller 142 can be configured to control the operation of the first and second systems 102, 104. The controller 142 can include a processing device 144, such as, for example, a programmable, dedicated, and/or hardwired state machine, or any combination thereof. Moreover, the processing device 144 can include multiple processors, such as, for example, Arithmetic-Logic Units (ALUs), Central Processing Units (CPUs), Digital Signal Processors (DSPs), or the like. Processing devices 144 with multiple processing units can also utilize distributed, pipelined, and/or parallel processing. The processing device 144 can also be dedicated to performance of just the operations described herein or may be utilized in one or more additional applications.

In the depicted form, the processing device 144 is of a programmable variety that executes algorithms and processes data in accordance with operating logic as defined by programming instructions (such as software or firmware) stored in a memory 146 of the control system 140. Alternatively or additionally, the operating logic is at least partially defined by hardwired logic or other hardware. The processing device 144 can include one or more components of any type suitable to process the signals received from the first and second systems 102, 104, and to provide desired output signals, such as, for example, signals to first and second system head actuators 148, 150 that can facilitate displacement of the first system head 134 and the second system head 128, respectively. Such components can also include digital circuitry, analog circuitry, or a combination of both.

The memory 146 can be included with the processing device 144 and/or coupled to the processing device 144. Further, the memory 146 can be of one or more types, such as a solid-state variety, electromagnetic variety, optical variety, or a combination thereof. Additionally, the memory 146 can be volatile, nonvolatile, or a combination thereof, and some or all of the memory 146 can be of a portable variety, such as a disk, tape, memory stick, cartridge, or the like. In addition, according to certain embodiments, the memory 146 can store data that is manipulated by the operating logic of the processing device 144, such as data representative of signals received from and/or sent to actuators and/or sensors of the first and second systems 102, 104, in addition to, or in lieu of, storing programming instructions defining the operating logic.

The first system 102 can include a variety of components that can provide information to, and/or receive instructions from, the controller 142. For example, according to certain embodiments, the first system 102 can include one or more first system head sensor(s) 162, such as, for example, a position and/or speed sensor that can provide information to the controller 142 relating to a location of the first system head 134, a speed at which the first system head 134 is moving, and/or an indication of a direction of travel of the first system head 134. Alternatively, or optionally, the first system head sensor 162 can provide information regarding the operation and/or performance of the first system head 134. Additionally, as previously mentioned, the first system 102 can also include one or more first system head actuator(s) 150, including for example, an actuator that, via a command from the controller 142, can be used to facilitate operation of the first system head 134 and/or the associated feeder system and corresponding feeder rollers 136.

Additionally, the first system 102 can also include a heat sensor 164 that can, for example, provide the controller 142 with an indication of the temperature being applied by the first system head 134 to the first starting material 108 and/or relating to the temperature of the first starting material 108 that is being outputted from the first system head 134. The first system 102 can also include a nozzle sensor 166, including, for example, a sensor that provides an indication of the quantity of the first starting material 108 that is being released from the first system head 134.

The first system 102 can also include a carrier sensor 168, which can for example, provide information to the controller 142 regarding the operation, position, and/or movement of a carrier that can be used in the displacement of the first system head 134. Such carriers can include, but are not limited to, electrically, mechanically, and/or hydraulically operated carriers that can at least assist in facilitating displacement of the first system head 134 along the first system track 138. Additionally, the controller 142 can provide signals to a carrier actuator 170 that can, via a signal from the controller 142, initiate or terminate operation of such a carrier, and thus control such movement of first system head 134 at least as the first system head 134 deposits or distributes layers of heated first starting material 108 during the construction of the electrical device.

As seen in FIG. 2, the second system 104 can include a variety of components that can provide information to, and/or receive instructions from, the controller 142. For example, according to certain embodiments, the second system 104 can include one or more second system head sensors 152, such as, for example, a position and/or speed sensor that can provide information to the controller 142 relating to a location of the second system head 128, a speed at which the second system head 128 is moving, and/or an indication of a direction of travel of the second system head 128. Alternatively, or optionally, the second system head sensor 152 can provide information regarding the operation and/or performance of the second system head 128. Additionally, the second system 104 can also include one or more second system head actuator(s) 148, including for example, an actuator 148 that, via a command from the controller 142, can be used to facilitate operation of the second system head 128.

The second system 104 can also include a laser head sensor 154, which can, for example, provide the controller 142 with an indication of the power being outputted by the energy source of the second system head 128, which in this example, is the electron beam or the laser beam 130. The second system 104 can also include a laser head actuator 156 that can be used by the controller 142 to control the activation and deactivation of the energy source. Addition- ally, or alternatively, the laser head sensor 154 can provide an indication of the power being inputted to generate the electron beam or the laser beam 130.

Additionally, the second system 104 can further include a carrier sensor 158, which can for example provide informa- tion to the controller 142 regarding the operation, position, and/or movement of a carrier that can be used in the displacement of the second system head 128. Such carriers can include, but are not limited to, electrically, mechanically, and/or hydraulically operated carriers that can at least assist in facilitating displacement of the second system head 128 along the second system track 132. Further, the controller 142 can provide signals to a carrier actuator 160 of the second system 104 that can initiate or terminate such opera- tion of the carrier, and thus control movement of second system head 128 at least as the second system head 128 delivers energy via the electron beam or the laser beam 130 to facilitate fusion or other bonding of the solid second starting material 106.

Figure 3A:
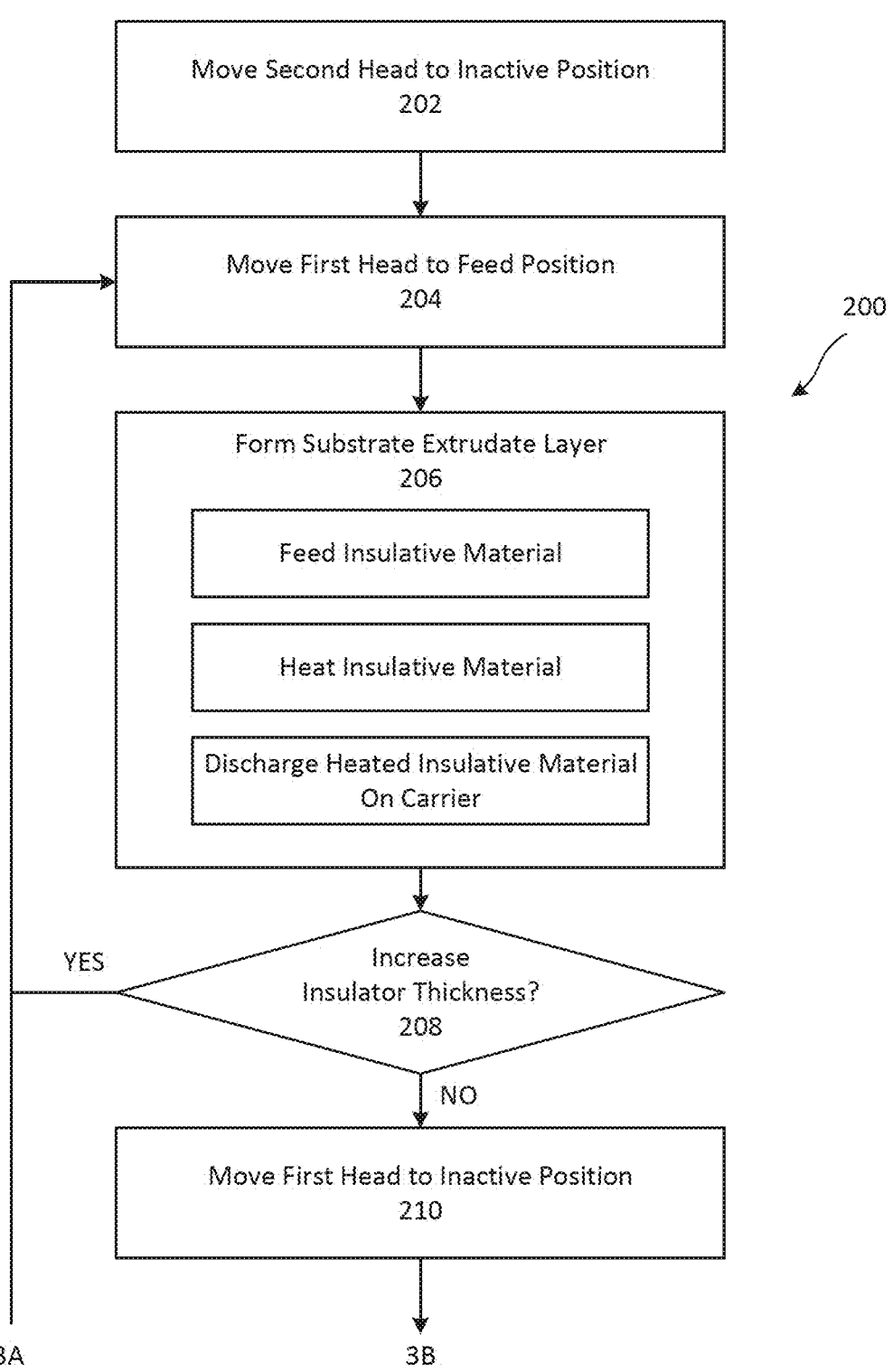
FIGS. 3A and 3B illustrate a process for forming an electrical device having electrically conductive layers and insulating layers via additive manufacturing utilizing solid raw starting materials according to an illustrated embodiment of the subject application.
Figure 3B:
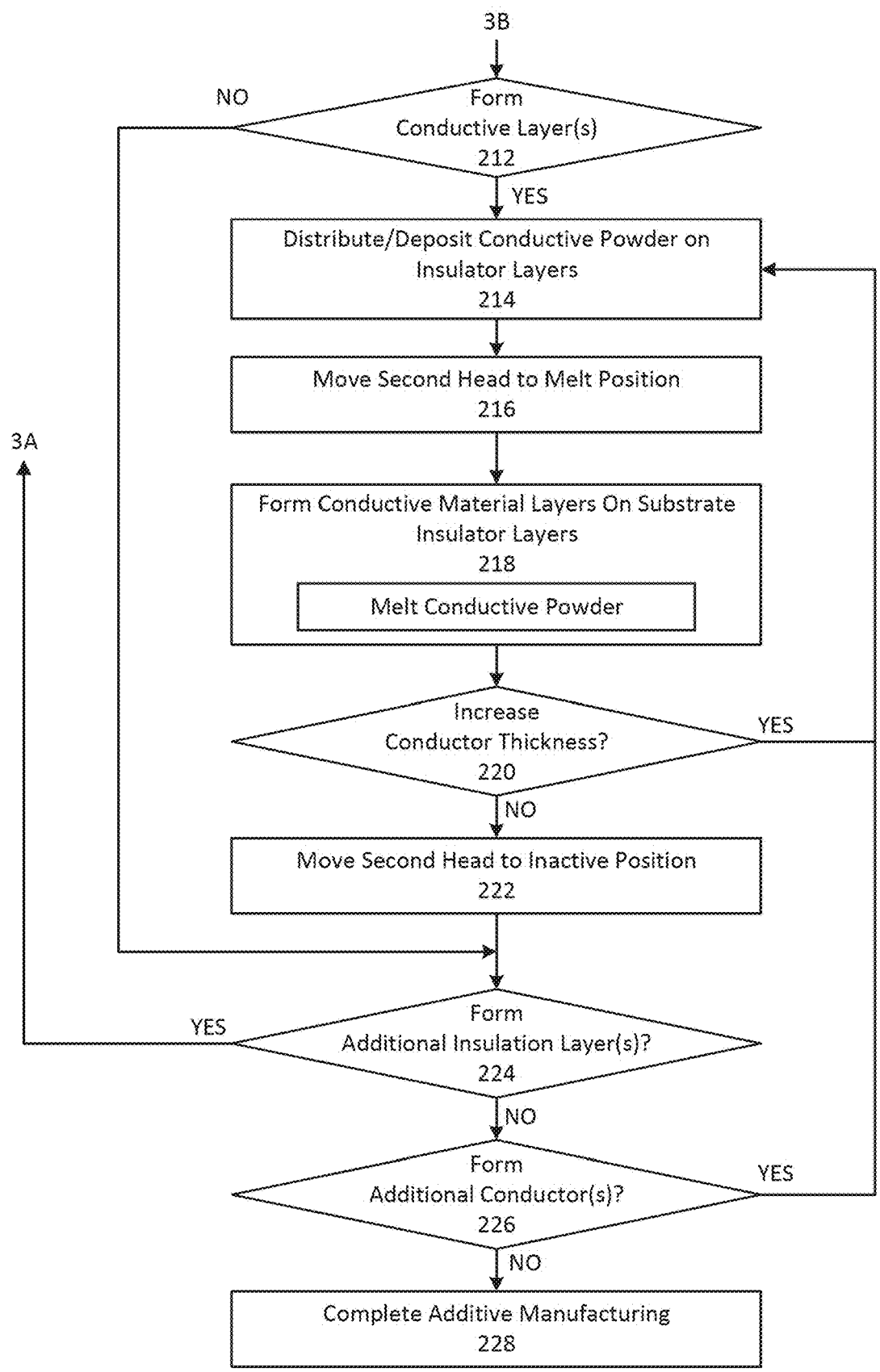

FIGS. 3A and 3B illustrate a process 200 for forming an electrical device having electrically conductive layers and insulating layers via additive manufacturing processes that utilize solid starting materials according to an illustrated embodiment of the subject application. For at least purposes of illustration, the processes discussed herein are discussed with respect to the exemplary first and second systems 102, 104. However, as previously mentioned, the processes can utilize a variety of different types of additive manufacturing systems in the formation of the electrical device, as well as different starting materials and associated fusion or bonding processes. Further, the operations illustrated for all of the processes in the subject application are understood to be examples only, and operations may be combined or divided, and added or removed, as well as re-ordered in whole or in part, unless explicitly stated to the contrary.

At step 202, the second system head 128 is de-energized and/or displaced to an inactive position, such as, for example, a position at which the second system head 128 will not interfere with the operation of the first system 102, including, for example, interfere with movement of the first system head 134 as the first system head 134 is depositing or distributing the second starting material. Thus, according to certain embodiments, the controller 142 can determine, including, for example, via use of information provided by the carrier sensor 158 of the second system 104, among other information, the position of the second system head 128. Using at least such information from the carrier sensor 158, the controller 142 can, if necessary, generate a signal to facilitate operation of the carrier actuator 160 of the second system 104 such that the second system head 128 is de- energized and/or displaced to the inactive position, as well as provide information as to when the controller 142 is to deactivate operation of the carrier of the second system 104.

At step 204, the controller 142 can generate a signal for the carrier actuator 170 of the first system 102 to facilitate movement of the first system head 134 to the a feed position, such as, for example, a position at which the first starting material 108 can be deposited or distributed by the first system head 134 at a location associated with the formation of the electrical device. For example, according to certain embodiments, at least at the early manufacturing stages, the feed position can be, for example, a position at which first starting material 108 can be deposited onto the platform 112, the pre-heated central core 114, and/or other pre-formed, and possibly pre-heated, component that may, or may not, be part of the electrical device that is being manufactured. Moreover, according to certain embodiments, the initial layer(s) of first solid starting material 108 can form at least a portion of an insulating layer about a central core 114 that may form a central electrical conductor, such as, for example, a central conductor of a condenser bushing. Fur- ther, as seen in FIG. 4B, during later stages of production, the feed position can be a position at which first starting material 108 can be deposited or distributed by the first system head 134 onto other portions of the electrical device 172 that are being formed by the process 200, including, for example, other previously deposited or distributed layers of the first starting material 108 in association with increasing a thickness of the associated insulating layer 180, or onto at least a portion of a previously formed electrically conductive layer 182 of the electrical device 172, among other portions of the electrical device 172 that is being manufactured. Additionally, according to certain embodiments, the carrier sensor 168 can provide information that is used by the controller 142 to determine when the first system head 134 has reached the feed position, and thus indicate when the controller 142 is to initiate operation of the first system head 134 of the first system 102.

At step 206, with the first system head 134 at the feed position, the first system 102 can be operated, such as, for example, via a signal from the controller 142, to initiate depositing or distributing the solid first starting material 108 onto the platform 112, the pre-heated central core 114, and/or another component of the electrical device. As seen in FIGS. 3A and 3B and shown in FIG. 4B, such operation during step 206 can include, for example, feeding the first starting material 108 to, and through, the first system head 134, such as, for example, via the feeder rollers 136, as the first system head 134 is displaced in a first or second direction along the first track 138. Further, as the first starting material 108 is being feed through the first system head 134, the first system head 134 can heat the second starting material. Thus, for example, according to the illus- trated embodiment in which the first starting material 108 is being used to form one or more insulating layers 180 of the electrical device, the first system head 134 can heat the first starting material 108 in a manner that results in the heated first starting material 108 being deposited or distributed, such as, for example, extruded or printed, from the first system head onto the platform 112, pre-heated central core 114, or a portion of the electrical device so as to form at least a portion of an insulating layer 180 of the electrical device 172.

Further, such depositing or distribution of the first solid starting material 108 can be pre-programmed or determined such that the first solid starting material 108 is, or is not, deposited at certain locations. For example, according to certain embodiments, at least the initial layers of the first solid starting material 108 deposited by the first system 102 onto the central core 114, and which can provide one or more inner insulator layers, can leave openings, gaps, and/or avoids in, or by, the inner insulator layer(s) that can accom- modate subsequently deposited electrically conductive material by the second system 104 to extend through, around, or by the inner insulator layer(s) such that the deposited electrically conductive material can form direct electrical contact between the central core 114, which, again, according to certain embodiments can be electrically conductive, and at least a first, or inner, electrical conductor layer of the electrical device.

At step 208, a determination can be made, such as, for example, by the controller 142, as to whether the first system head 134 should continue to, or again, be operated to deposit or distribute additional first starting material 108. For example, in connection with increasing the thickness of at least a portion of the insulating of the electrical device 172, the first system head 134 can continue to be operated to deposit one or more additional layers of heated first starting material 108 over the previously deposited heated first starting material 108. Indeed, according to certain embodiments, during step 206, the first system head 134 can deposit or distribute a layer of heated first starting material 108 as the first system head 134 is being displaced along the first track 138 in a first direction, and, following the determination at step 208 to continue forming the insulating layer, continue depositing another layer of the heated first starting material 108 as the first system head 134 is being displaced in a second direction that is opposite to the first direction. The determination at step 208 of whether to continue, or again, deposit the first starting material 108 can be based on a variety of considerations, including, for example, providing an insulating layer 180 of the electrical device 172 with a thickness will have certain electrical characteristics or performance capabilities for the electrical device 172. Moreover, according to certain embodiments, the resolution of the additive manufacturing process being employed by the first system 102 can generally be known such that the amount of first starting material 108 being deposited from the first system head 134 for each layer or collection of layers of first solid starting material 108 that is deposited by the first system head 134 can generally be known or determined. Thus, according to the illustrated embodiment, if the determination at step 208 is to continue with depositing another layer of the first starting material 108, then the process 200 can return to step 206.

If the determination at step 208 is that the thickness of at least the portion of the insulating layer 180 that is currently being formed is sufficient, and thus the deposition of the first starting material 108 is to at least temporarily cease, then at step 210, the controller 142 can provide a signal to the carrier actuator 170 to displace the first system head 134 to a de-energized or inactive position at which the first system head 134 at least does not interfere with the operation of the second system 104, such as, for example, does not interfere with movement of the second system head 128.

At step 212, the controller 142 can determine whether one or more conductive layers 182 are to be formed. If the decision at step 212 is to not form, or not form any additional, conductive layers 182, then the process can proceed to step 224, as discussed below. However, if the decision at step 212 is to form one or more conductive layers 182, then at step 214 the second starting material 106, in this example a metallic or non-metallic powder comprising an electrically conductive material that is used to form one or more electrically conductive layers of the electrical device, can be deposited or distributed via operation of the applicator 118 onto a portion of the electrical device, including, for example, being distributed over at least a portion the first starting material 108 that was deposited or discharged at step 206. As previously discussed, with respect to at least the initial or inner conductive layer formed using the second starting material 106, according to certain embodiments such distribution of the powder can include positioning the powder at a location that, at least when fused, forms an electrical connection directly between the inner conductive layer and the central core 114. Additionally, at step 216, the second system head 128 can be moved, such as, for example via command from the controller 142 to the carrier actuator 160, to a position at which the second system head 128 is positioned to discharge the electron beam or the laser beam 130 onto the distributed second starting material 106, such as, for example the powder bed 120 that was formed at step 214.

Figure 4A:
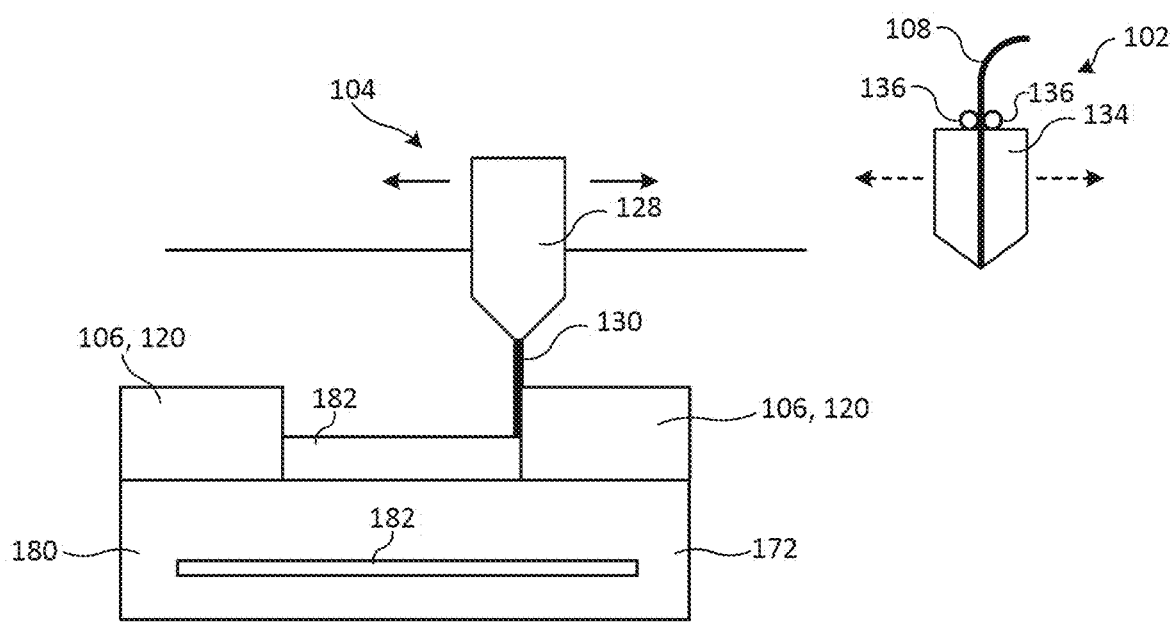
FIG. 4A illustrates a representation of an exemplary additive manufacturing process in which a first nozzle is utilizing a solid starting material to form a conductive layer(s) on an insulating layer(s) of an electrical device while a second nozzle is in a de-energized or inactive state according to an embodiment of the subject application.
Figure 4B:
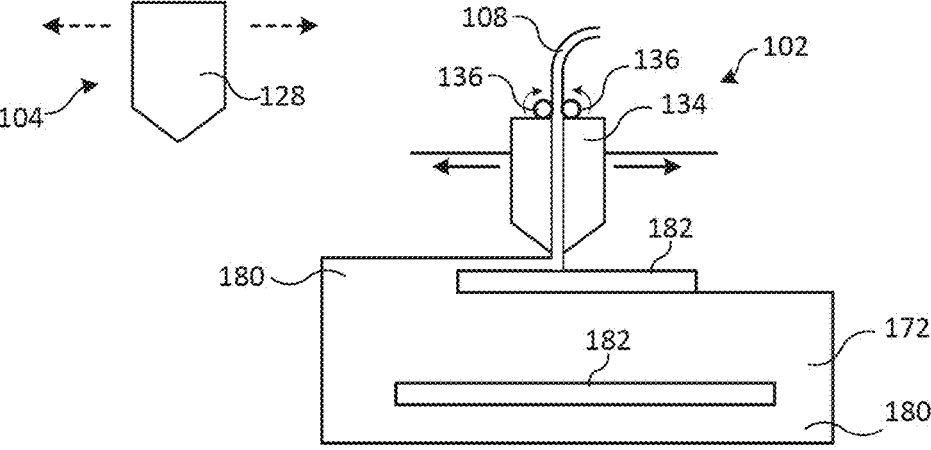
FIG. 4B illustrates the representation of the exemplary additive manufacturing process shown in FIG. 4A in which the second nozzle is utilizing a solid starting material to form an insulating layer(s) on the previously formed conductive layer(s) while the first nozzle is in a de-energized or inactive state.

At step 218, as shown in FIG. 4A, the second system head 128 can be operated so as to apply the energy source, such as, for example, the electron beam or the laser beam 130 onto the distributed powder bed 120 of the second starting material 106 as the second system head 128 is displaced in at least a first direction along the second track 132 so as to facilitate melting, fusion, and/or bonding of the deposited powder second starting material 106, and thereby form an electrically conductive layer 182 for the electrical device 172. At step 220, the controller 142 can determine whether to continue with forming the conductive layer 182, such as, for example, to increase the thickness of the conductive layer 182 that is currently being formed. Thus, if the thickness of the currently formed conductive layer is to be increased, as determined at step 220, the process 200 can return to step 214, and additional second starting material 106 can be applied to an adjacent portion of the conductive layer 182 that was previously formed.

Following the formation of the electrically conductive layer 182 at step 222, the second system head 128 can return, such as, for example, via operation of the carrier actuator 170, to the prior de-energized or inactive position, or can be moved to another de-energized or inactive position at which the second system head 128 may not interfere with the operation of the first system 102. At step 224, the process 200 can determine whether another layer of first starting material 108 is to be deposited or distributed by the first system head 134, such as, for example, over at least a portion of the conductive layer 182 that was formed at steps 214-218, and as shown for example, in FIG. 4B. Additionally, according to certain embodiments, and for certain electrical devices, the decision at step 224 may involve a determination of whether an outer insulating layer 180 that is traditionally formed via extrusion should instead be formed via operation of the first system 102 and an associated depositing or distribution of additional first starting material 108 onto the electrical device 172.

If at step 222 a determination is made that one or more additional insulating layer(s) are to be formed, the process 200 can return to step 204, and the first system head 134 can again be operated to form an additional insulating layer(s) 182. Alternatively, if the decision at step 224 is to not form any additional insulation layers 182, then the process can proceed to step 226, where a determination can be made as to whether to proceed with forming any additional conductive layers 182. If, the determination at step 226 is to form one or more additional conductive layers 182, then the process can return to step 214, and the depositing or distribution of second starting material 106 that will be used in the formation of the additional conductive layer(s) 182 can again commence. Alternatively, if the determination at step 226 is to not form one or more additional conductive layers 182, then the process 200 can proceed to completion at step 228.

Figure 5A:
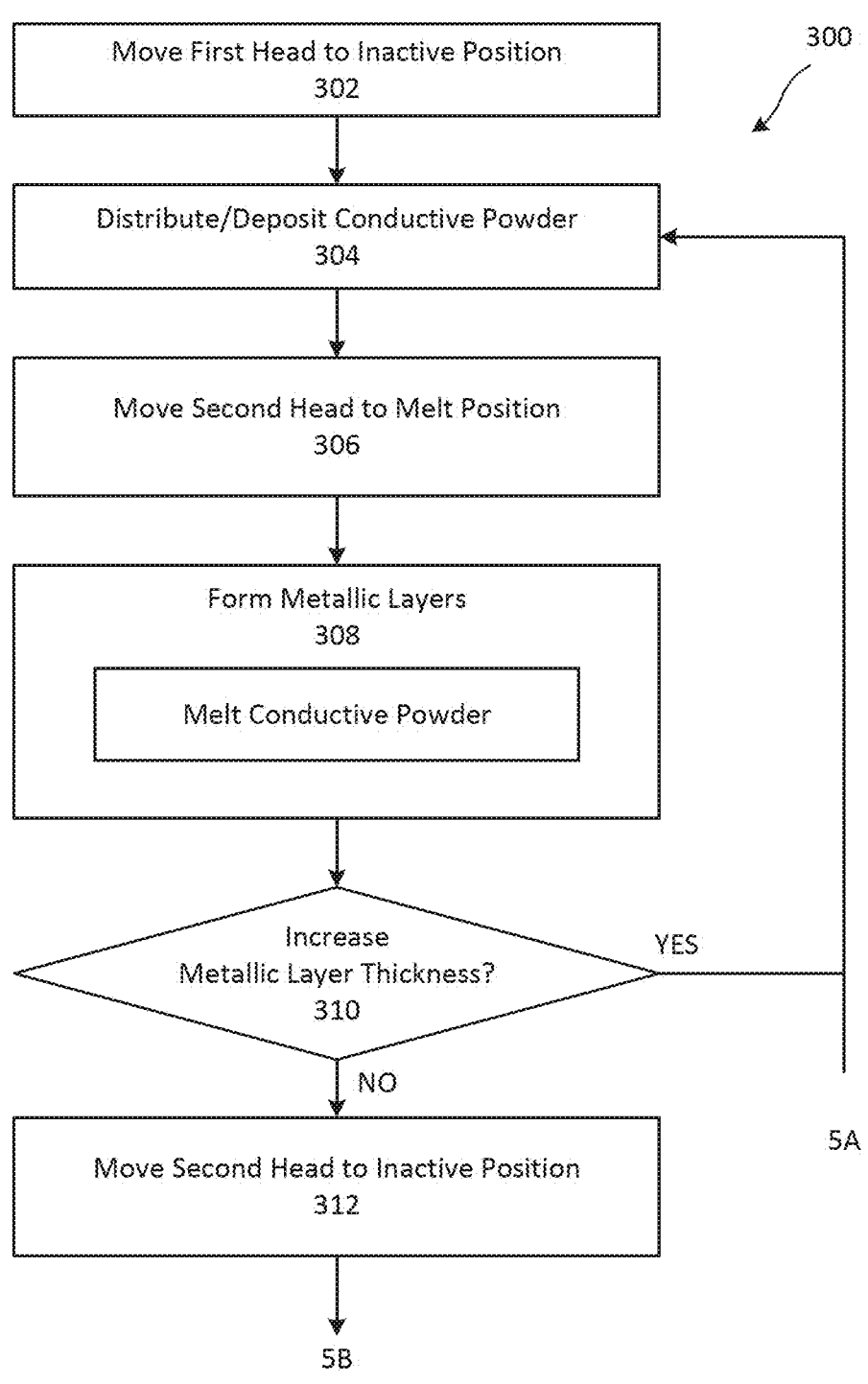
FIGS. 5A and 5B illustrate a process for forming an electrical device having electrically conductive layers and insulating layers via additive manufacturing utilizing solid starting materials according to an illustrated embodiment of the subject application.
Figure 5B:
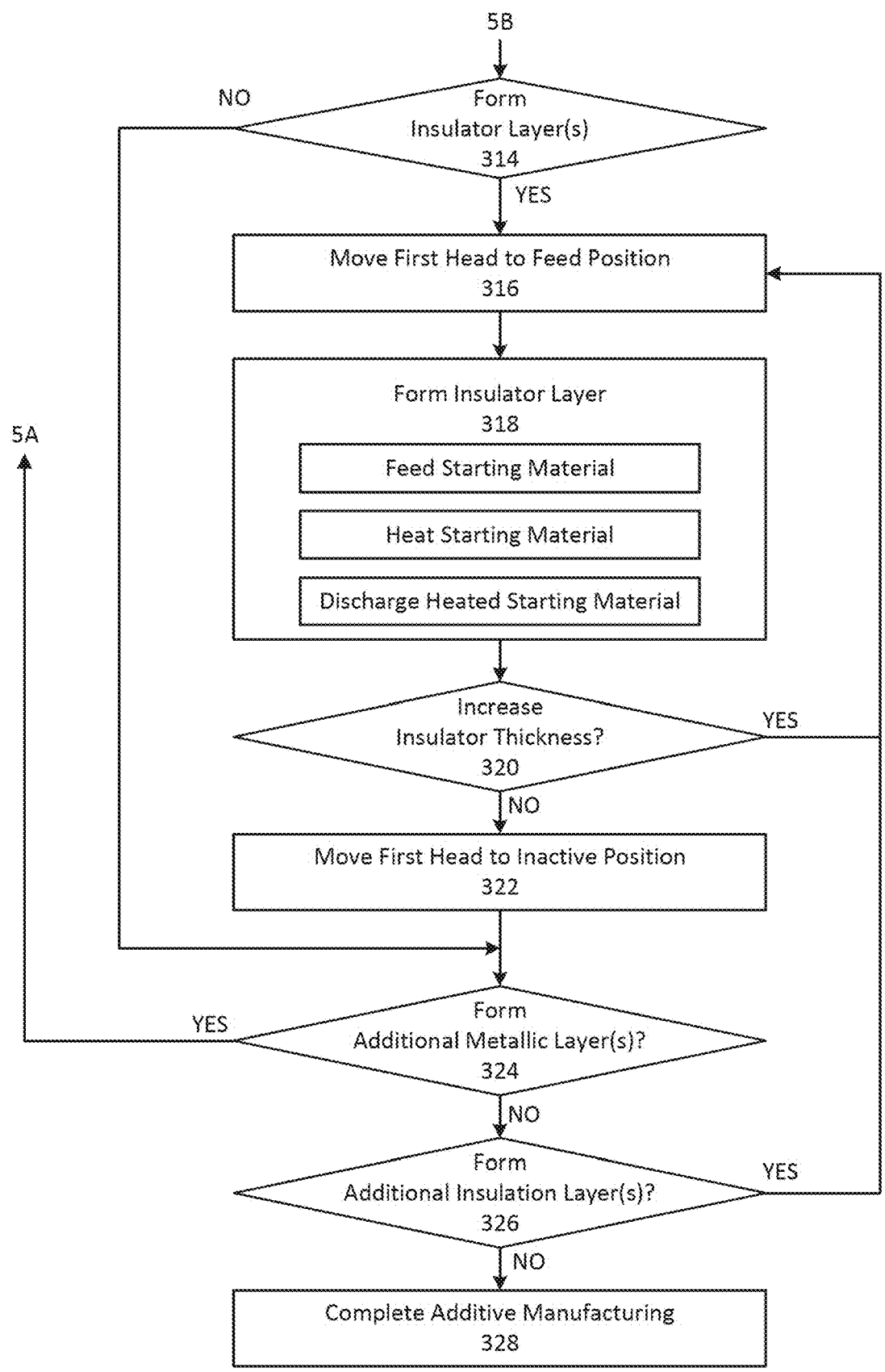
Figure 6A:
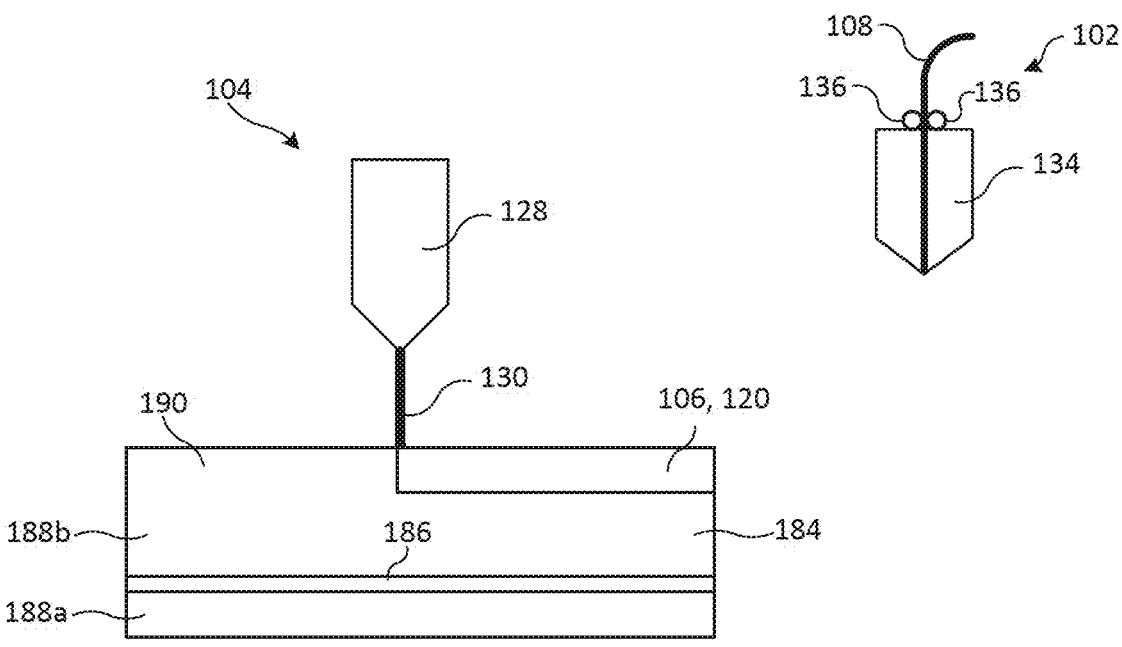
FIG. 6A illustrates a representation of an exemplary additive manufacturing process in which a first nozzle is utilizing a solid starting material to form multiple conductive layers on an insulating layer(s) of an electrical device while a second nozzle is in a de-energized or inactive state according to an embodiment of the subject application.

While the foregoing exemplary process 200 was discussed in terms of initially beginning with the first system 102, such as, for example, the first system 102 applying one or more insulator layers to a central core 114 of an electrical device, according to other embodiments, operation of the second system 104, and formation of associated metallic components, including for example, electrical conductors, can precede operation of the first system 102. For example, such an operation can be utilized in the formation of an electrical device 184, such as, for example, the component shown in FIGS. 6A and 6B, in which an insulating layer 186 separates a pair of metallic parts or compartments 188*a*, 188*b*. Thus, for example, FIGS. 5A and 5B illustrate a process 300 in which, at step 302, the first system head 134 is at a de-energized or inactive position. At step 304 the second starting material 106, in this example the powder comprising an electrically conductive material that is used to form the one or more metallic layers or compartments 188*a*, 188*b*, including, but not limited to, electrically conductive layers, of the electrical device, can be deposited or distributed onto the platform 112, the pre-heated central core 114, and/or another component of the electrical device. At step 306, the second system head 128 can be moved, such as, for example, in response to a command from the controller 142 to the carrier actuator 160, to a position at which the second system head 128 is positioned to discharge the electron beam or the laser beam 130 onto powder bed 120 of the distributed second starting material 106.

At step 308, the second system head 128 can be operated so as to provide the energy source, such as, for example, the electron beam or the laser beam 130, as the second system head 128 is displaced in at least a first direction along the second track 132 so as to facilitate the melting, fusion, and/or bonding of the deposited powder second starting material 106 in connection with forming a metallic layer 190 for the metallic compartment 188*b*. At step 310, the controller 142 can determine whether to continue with forming the metallic layer 190, such as, for example, whether to increase the thickness of the metallic layer 190 that is currently being formed. Thus, if the thickness of the currently formed metallic layer 190 is to be increased, as determined at step 310, then the process can return to step 314, and additional second starting material 106 can be applied to an adjacent portion of the metallic layer 190 that was previously formed.

Following the formation of the metallic layer 190, at step 314 the second system head 128 can be displaced, such as, for example, via operation of the carrier actuator 160 in response to a signal generated by the controller 142, to a de-energized or inactive position such that the second system head 128 is at a position at which the second system head 128 will not interfere with the operation of the first system 102, and, moreover, will not interfere with the movement of the first system head 134.

At step 316, the controller 142 can generate a signal for the carrier actuator 170 of the first system 102 to move the first system head 134 to the feed position, such as, for example, a position at which the first starting material 108 can be deposited by the first system head 134 onto the previously formed metallic layer 190 and/or another insulating layer 186. Additionally, according to certain embodiments, the carrier sensor 168 can provide information that is used by the controller 142 to determine when the first system head 134 has reached the feed position, and thus indicate when the controller 142 is to initiate operation of the second head 134 of the first system 102.

Figure 6B:
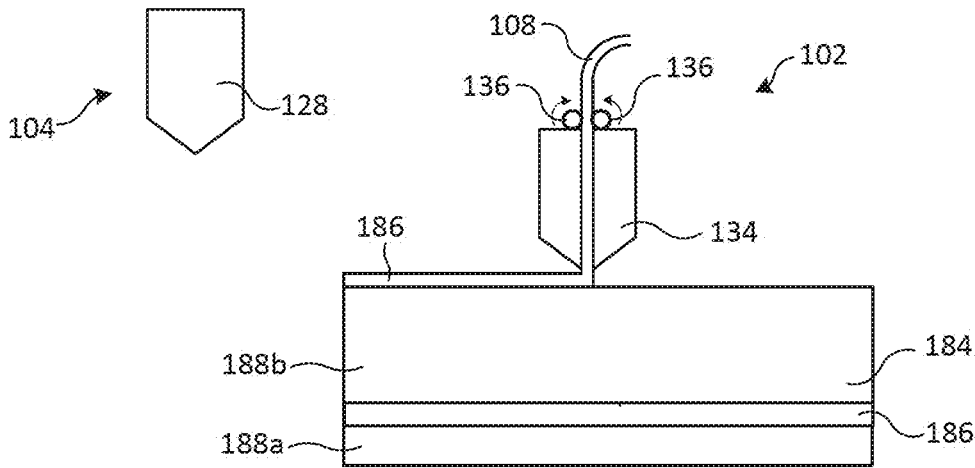
FIG. 6B illustrates the representation of the exemplary additive manufacturing process shown in FIG. 6A in which the second nozzle is utilizing a solid starting material to form an insulating layer on the previously formed conductive layer(s) while the first nozzle is in a de-energized or inactive state.

At step 318, with the first system head 134 at the feed position, the first system head 134 can be operated, such as, for example, via a signal from the controller 142, to deposit or distribute the solid first starting material 108 onto an adjacent metallic layer 190 and/or onto an adjacent insulating layer 186. As seen in FIG. 6B, such operation during step 318 can include, for example, feeding the first starting material 108 to, and through, the first system head 134, such as, for example, via the feeder rollers 136, as the first system head 134 is displaced in a first or second direction along the first track 138. Further, as previously discussed, as the first starting material 108 is being feed through the first system head 134, the first system head 134 can heat the first starting material 108. Thus, for example, according to the illustrated embodiment in which the first starting material 108 is being used to form one or more insulating layers 186 of the electrical device 184, the first system head 134 can heat the first starting material 108 in a manner that results in the heated second staring material 180 being deposited from the first system head 134 so as to form at least a portion of an insulating layer 186 of the electrical device 184.

At step 320, a determination can be made, such as, for example, by the controller 142, as to whether the first system head 134 should continue to, or again, be operated to deposit additional first starting material 108. For example, in connection with increasing the thickness of at least a portion of the insulating of the electrical device 184, the first system head 134 can continue to be operated to deposit one or more additional layers of heated first starting material 108 over the previously deposited heated first starting material 108. The determination at step 320 of whether to continue, or again, deposit or distribute the first starting material 108 can be based on a variety of considerations, including, for example, providing an insulating layer 186 of the electrical device 184 with a thickness will have certain electrical characteristics or performance capabilities for the electrical device 184. Thus, according to the illustrated embodiment, if the determination at step 320 is to continue with depositing the first starting material 108, then the process 300 can return to step 318.

If the determination at step 320 is that the thickness of at least the portion of the insulating layer 186 currently being formed is sufficient, and thus the deposition of the first starting material 108 is to at least temporarily cease, then at step 322 the controller 142 can provide a signal to the carrier actuator 170 to displace the first system head 134 to a de-energized or inactive position.

At step 324, the controller 142 can determine whether one or more additional metallic layers 190 are to be formed. If the decision at step 324 is to form one or more additional metallic layers 190, then the process can return to step 304. Otherwise, if the decision at step 324 is to not form any additional metallic layers 190, then the process 300 can proceed to step 326, where a decision can be made, such as, for example, by the controller 142, whether to form any additional insulating layers 186. If the decision at step 326 is to form one or more additional insulating layers 186, then the process 300 can return to step 316. Alternatively, if the determination at step 326 is to not form any additional insulating layers 186, then the process 300 can proceed to completion at step 328.

Figure 7:
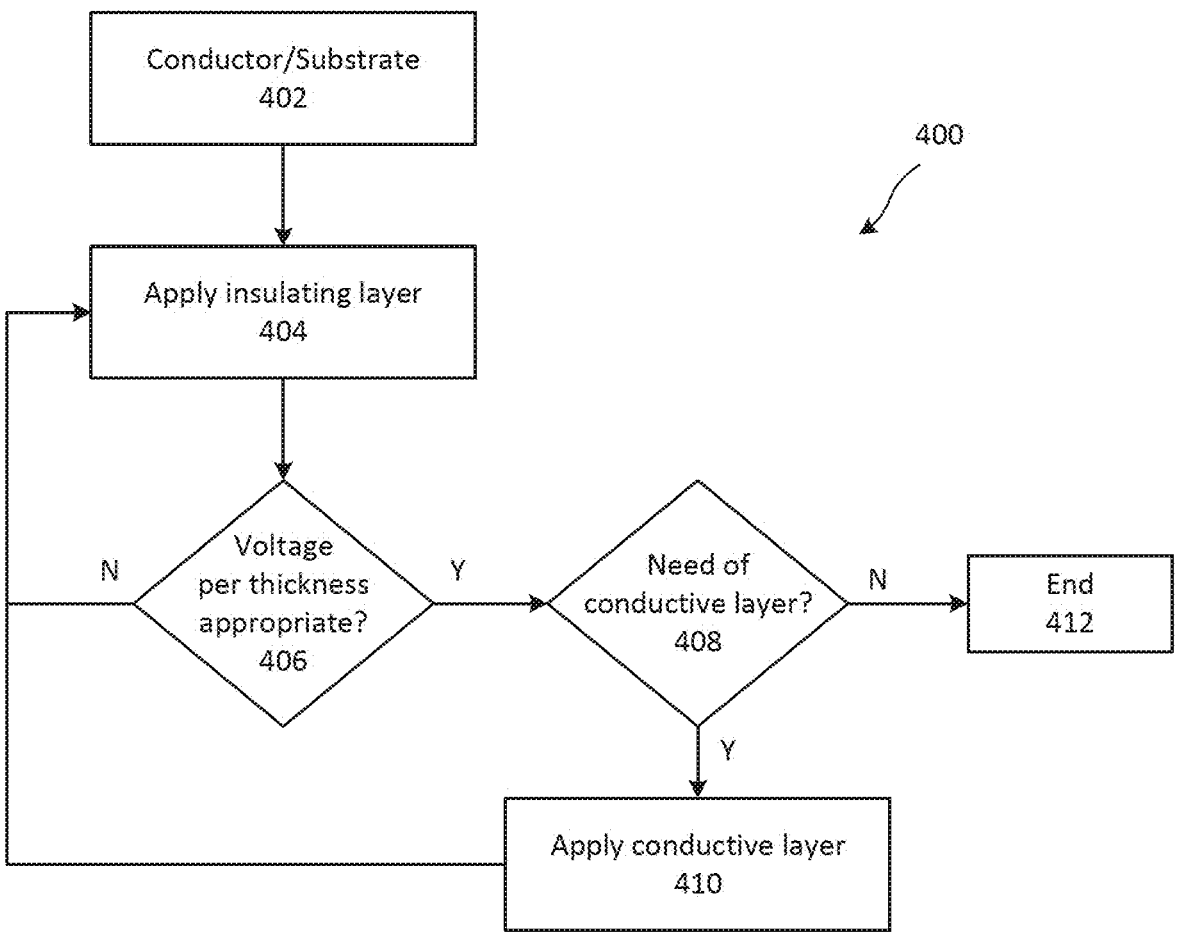
FIG. 7 illustrates a control process for forming an electrical device having an electrically conductive layer(s) and insulating layers via additive manufacturing utilizing solid starting materials according to an illustrated embodiment of the subject application.

FIG. 7 illustrates a control process 400 for forming an electrical device 172, 184 having electrically conductive layers 182, 190 and insulating layers 180, 186 via additive manufacturing utilizing solid raw materials according to an illustrated embodiment of the subject application. The process 400 can begin with a substrate, such as, for example, the central core 114, on which the electrical device 172, 184 will be built by the first and second systems 102, 104. According to certain embodiments, the substrate provided at step 402 can be a part of the electrical device 172, 184 that is being manufactured, such as, for example, a central conductor of a condenser bushing. At step 404, an insulating layer 180, 186 can be formed on the substrate, such as, for example, via operation of the first system 102, as previously discussed. More specifically, according to certain embodiments, at step 404 a heated first starting material 108 that will provide the material for at least one layer of the insulating layer 180, 186 can be deposited or distributed onto at least a portion of the substrate via operation of at least the first system head 134, as previously discussed.

At step 406, a determination can be made as to whether the insulating layer 180, 186 formed via step 404 has a sufficient thickness. For example, at step 406, the controller 142 can determine, based on the quantity of first starting material 108 deposited onto the substrate via operation of the first system head 134, a current thickness of the insulating layer 180, 186. Based on the determined thickness of the insulating layer 180, 186, as well as knowledge of the properties of the first starting material 108, including, for example, the dielectric strength of the material, referred to in FIG. 7 as voltage per thickness, the controller 142 can determine an insulation capacity of the currently formed insulating layer 180, 186, and based on that determination, decide whether an additional layer(s) of the solid first starting material 108 should be deposited so as to increase the thickness of at least the current insulating layer 180, 186. Such a determination can also take into consideration the resolution of the particular additive manufacturing process being utilized, which can provide at least a general indication of the quantity of first starting material 108 being deposited or distributed by the first system head 134 and/or by the first system 102 in each layer, or collection of layers. Moreover, according to certain embodiments, the thickness the insulator layer(s) is to attain can be predetermined, such as, for example, via knowledge of the electric properties or characteristics of the first starting material 108 and the resolution of the additive manufacturing process being employed by the first system 102. Thus, at step 406, a determination can be made as to whether, based on the current thickness of the insulating layer 180, 186, the insulating capabilities of the insulating layer 180, 186 satisfy a predetermined insulation threshold, such as, for example, has sufficient dielectric strength to withstand exposure to anticipated electric fields that may arise during operation of the electrical device 172, 184. If at step 406 a determination is made that the thickness of the insulating layer 180, 186 is to be increased, then the process 400 can return to step 404.

If at step 406 a determination is made that the thickness of the insulating layer 180, 186 is sufficient, then at step 408, a determination can be made as to whether a conductive layer 182, 190 is to be formed. If a conductive layer 182, 190 is to be formed, then the process 400 can proceed to step 410, wherein one or more conductive layers 182, 190 can be formed, such as, for example, via operation of the second system 104, as previously discussed. Such a process can include forming, using the second starting material 106, and electrical connection, if any, between the central core 114 and the first, or inner most, electrically conductive layer. Following formation of one or more of the conductive layers 182, 190, the process can return to step 404, wherein another insulating layer 180, 186 can be formed via operation of the first system 102. Moreover, upon returning to step 404, an insulating layer 180, 186 can at least be formed over at least a portion of the conductive layer 182, 190 that was formed at step 410.

The process 400 can be continued at least until the desired insulating layers 180, 186 and conductive layers 182, 190 are formed. Thus, obtain attaining the desired insulating layers 180, 186 (with appropriate thicknesses) and conductive layers 182, 190, if the determination at step 408 is that additional conductive layers 182, 190 are not needed, the process can conclude at step 412.

Figure 8A:
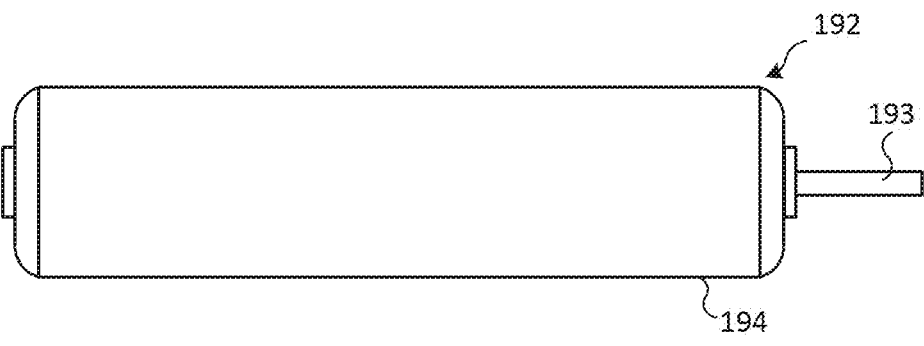
FIGS. 8A and 8B illustrate a side view and a cross sectional view, respectively, of an exemplary electrical device formed using an additive manufacturing system according to an embodiment of the subject application.
Figure 8B:
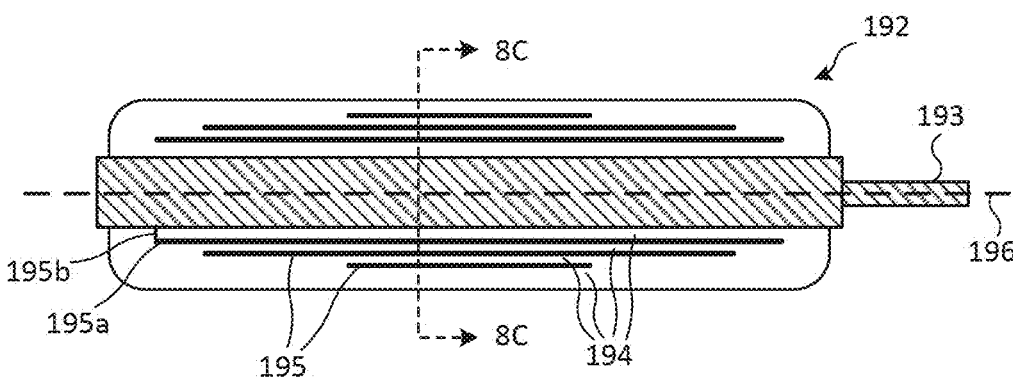
Figure 8C:
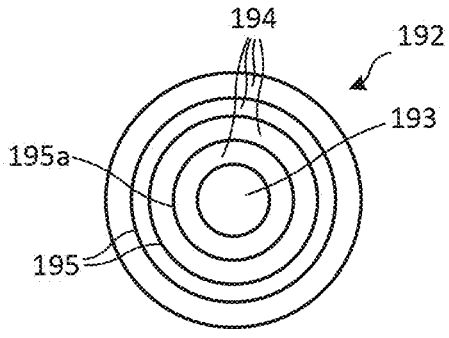
FIG. 8C illustrates a cross sectional view the electrical device taken along line 8C-8C of FIG. 8B.

The additive manufacturing system 100 and associated processes 200, 300, 400 of the illustrated embodiments of the subject application can accommodate formation of electrical devices 172, 184 having a wide range of configurations. Moreover, embodiments of the subject application can accommodate a relatively fast and accurate manufacturing of electrical devices 172, 184 having various degrees of complexity. For example, FIGS. 8A-8C illustrate an exemplary electrical device 192 in the form of a condenser bushing having, at the core of the electrical device 192, a cylindrical conductor 193, which may have been provided as the central core 114 in connection with the above-mentioned processes 200, 300, 400. While the conductor 193 shown in FIGS. 8A-8C is cylindrical, the conductor 193 can have a variety of other shapes. Positioned radially about the conductor 193 are a plurality of insulating layers 194, such as, for example, insulating layers 194 formed using the heated first starting material 108. Additionally, condenser bushings capable of use in at least a variety of high voltage applications can be formed via the processes 200, 300, 400 discussed herein, including, for example, applications in which the bushing may be exposed to voltages of around 19 kilovolts (kV) to around 100 kilovolts (kV).

Additionally, as seen in at least FIG. 8B, the insulating layers 194 can be configured to separate a plurality of conductive layers 195, 195a that can be radially distributed about the electrical device 192. As shown, in the illustrated embodiment, an inner conductive layer 195a can be formed to include an electrical connection between an inner conductive layer 195a and the cylindrical conductor 193, as previously discussed. Additionally, this connector 195b can be formed using the second starting material 106 during the formation of the inner conductive layer 195a, and moreover, subsequent to the formation of the adjacent portion of the insulator layer(s) 194 that is positioned between the inner conductive layer 195a and the cylindrical conductor 193. Additionally, one or more of the other conductive layers 195, and moreover, one of more of the conductive layers 195 that are not in direct physical electrical contact with the inner conductive layer 195a can be configured for electrical contact with another electrically conductive component, such as, for example, a flange that is operably connected to ground.

Additionally, according to the illustrated embodiment, the axial lengths of the conductive layers 195,195a and/or the axial starting and/or ending positions of the conductive layers 195, 195a relative to at least a central longitudinal axis 196 of the central conductor 193, can vary, thereby providing at least variations in the electric field grading of the electrical device 192. Further, according to the illustrated embodiment, as seen along the cross section view of FIG. 8C, the electrical device 192 can alternate between insulating layers 194 and conductive layers 195 so as to, at least in the region of the illustrated cross-sectional view, provide alternating concentric insulating and conductive layers 194, 195. However, as indicated by at least FIG. 8B, the conductive layers 195 formed by embodiments of the subject application can be positioned at a variety of other radial locations relative at least to the central longitudinal axis 196 of the central conductor 193. Additionally, the thicknesses or height of each of the insulating layers 194 between adjacent conductive layers 194, 195 may, or may not, be generally uniform.

Figure 9:
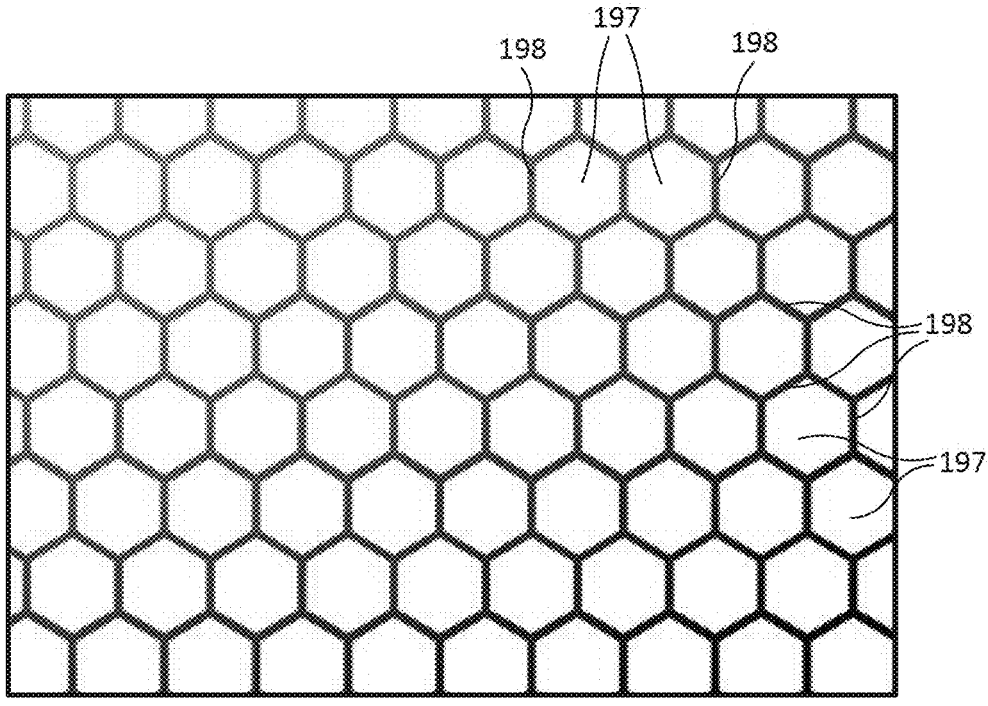
FIG. 9 illustrates an insulating layer having a honeycomb lattice configuration formed using processes of the subject application.

While FIGS. 8A-8C illustrate an electrical device 192 in the form of a condenser bushing formed using embodiments of the subject application, a variety of other types of electrical devices having various geometrical configurations and complexities can be formed using embodiments of the subject application. For example, the system 100 and processes 200, 300, 400 discussed herein can also accommodate the formation of hollow structures or portions 197 (FIG. 9) within the electrical device 172, 184, 192, including, for example, within the conductive layers 182, 190, 195, insulating layers 180, 186, 194, and/or between the conductive layers 182, 190, 195 and the insulating layers 180, 186, 194. For example, FIG. 9 illustrates an insulating layer 198 having a honeycomb lattice structure in which hollow regions 197 are positioned between, or otherwise bordered by, portions of the insulating layer 198.

In addition to providing a reduction in material, and thus potential cost and/or manufacturing benefits, such hollow regions 197 can provide areas in the associated electrical device that can be under vacuum, or, alternatively, be filled with a gas that may be non-flammable, and which can be selected to provide a relatively high electrical breakdown strength for the electrical device 172, 184, 192. For example, according to certain embodiments, insulating layer(s) 198 having hollow regions 197 can comprise one or more insulating layers 198 that are formed in an environment containing an insulating gas that is to be contained within the hollow regions 197, such as, for example, sulfur hexafluoride (SF6). Further, opposing ends of these hollow regions 197 can be enclosed by other portions of the insulating layer(s) or adjacent conductive layers, thereby entrapping gas within these hollow regions 197 from the surrounding environment. Alternatively, the conductive layers can be formed to accommodate passageways that can allow a mechanical pump to remove gas hollow regions 197 so as to, upon sealing or closing of the passageways, provide a vacuum within the hollow regions 197. An over coating process, including, for example, a dipping or spraying over coating process, can also be employed decrease the gas permeability of the electrical device, which can assist in maintaining the gases or vacuum within these hollow regions 197.

Additionally, embodiments of the subject application can also be used to manufacture multi-conductor bus bars, including, for example, laminated bus bars and three-phase bus bars that can be formed to include integrated cooling channels. Moreover, the selective control provided by the various types of additive manufacturing systems employed by the first and second systems 102, 104 and the associated precision provided at least when utilizing solid starting materials, can allow for the formation of relatively accurate detailed features in electrical device.

While the disclosure has been described in connection with what is presently considered to be the most practical and preferred embodiment, it is to be understood that the disclosure is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method of forming an electrical device, the method comprising:

depositing, on at least a portion of a central core, one or more layers of a first solid starting material to form a first insulator layer;

depositing, on at least a portion of the first insulator layer, one or more layers of a second solid starting material to form a first conductor layer, the second solid starting material comprising an electrically conductive material; and depositing, on the first conductor layer, one or more layers of the first solid starting material to form a second insulator layer, wherein the first conductor layer is electrically insulated by the second insulating layer and by at least a part of the first insulating layer; and subsequently depositing a portion of the second solid starting material on the central core to form a direct electrical connection between the central core and the first conductor layer, wherein the central core is an electrically conductive conductor; and wherein at least one of the one or more layers of the first solid starting material comprises a lattice structure having a plurality of hollow regions encasing at least one of an electrically insulating gas or a vacuum.

2. The method of claim 1, wherein depositing the second solid starting material includes distributing a powder comprising an electrically conductive material to form a powder bed on at least a portion of the first insulator layer.

3. The method of claim 2, further comprising fusing the deposited second solid starting material by applying a high-energy source to the powder bed.

4. The method of claim 1, wherein depositing one or more layers of the first solid starting material to form the second insulator layer comprises depositing a polymer or ceramic.

5. The method of claim 1, further comprising repeating the depositing, on at least the portion of the first insulator layer, the one or more layers of a second solid starting material and the depositing, on the first conductor layer, the one or more layers of the first solid starting material to form a plurality of conductor layers and a plurality of insulator layers.

6. The method of claim 5, wherein each of the plurality of conductor layers are at different radial position relative to at least the electrically conductive conductor.

7. The method of claim 6, wherein at least one of an axial starting position and an axial ending position of at least one conductor layer of the plurality of conductor layers is different than a corresponding axial starting position or axial ending position of another conductor layer of the plurality of conductor layers.

8. The method of claim 1, wherein depositing the first solid starting material to form the first insulator layer and depositing the first solid starting material to form the second insulator layer are performed using a first additive manufacturing process, and wherein depositing the second solid starting material is performed using a second additive manufacturing process, the second additive manufacturing process being different than the first additive manufacturing process.

9. The method of claim 1, further including:
determining whether an insulating capacity of the first insulator layer satisfies a predetermined threshold; and
continuing the depositing the one or more layers of the first solid starting material at least until the insulating capacity of the first insulator layer satisfies the predetermined threshold.

10. The method of claim 1, wherein the electrical device is a condenser bushing.

11. A method of forming an electrical device, the method comprising:
applying, by a first system head, one or more layers of a first solid starting material, at least one layer of the one or more layers of the first solid starting material being applied onto a central core of the electrical device;
fusing the applied one or more layers of the first solid starting material to form an insulator layer;
determining that an insulating capacity of the applied one or more layers of the first solid starting material does not satisfy a predetermined threshold;
continuing the applying the one or more layers of the first solid starting material at least until the insulating capacity satisfies the predetermined threshold;
applying, by a second system head, one or more layers of a second solid starting material onto at least a portion of the insulator layer;
fusing the applied one or more layers of the second solid starting material to form an electrical conductor layer;
repeating the applying the at least one layer of the first solid starting material, the fusing the applied one or more layers of the first solid starting material, the determining whether an insulating capacity of the applied one or more layers of the first solid starting material satisfies a predetermined threshold, continuing the applying the one or more layers of the first solid starting material at least until the insulating capacity satisfies the predetermined threshold, the applying the one or more layers of the second solid starting material, and the fusing the applied one or more layers of the second solid starting material to form a plurality of insulator layers and a plurality of electrical conductor layers;
applying, by the first system head, one or more layers of the first solid starting material to form an outer insulator layer about an outermost layer of the plurality of electrical conductor layers; and
wherein at least one of the one or more layers of the first solid starting material comprises a lattice structure having a plurality of hollow regions encasing at least one of an electrically insulating gas or a vacuum.

12. The method of claim 11, further comprising forming an electrical connector directly between the central core and at least one of the plurality of electrical conductor layers, and
wherein the central core is an electrically conductive conductor.

13. The method of claim 12, wherein forming the electrical connector comprises distributing one or more layers of the second solid starting between the central core and at least one of the plurality of electrical conductor layers, the second solid starting material being a powder comprising an electrically conductive material, and sintering the distributed one or more layers of the second solid starting material.

14. The method of claim 11, further including applying an over coating to the electrical device to decrease a gas permeability of the electrical device.

15. The method of claim 11, wherein applying the one or more layers of the second solid starting material comprises either extruding or printing the second solid starting material from the second system head.

16. The method of claim 15, wherein fusing the applied one or more layers of the second solid starting material comprises applying a high-energy source to the second solid starting material.

17. The method of claim 8, wherein the first additive manufacturing process comprises Fused Deposition Modeling (FDM), and wherein the second additive manufacturing process comprises Selective Laser Melting (SLM).

* * * * *